United States Patent [19]

Moles et al.

[11] Patent Number: 4,886,395
[45] Date of Patent: Dec. 12, 1989

[54] PIPELINE TO RISER CONNECTION METHOD AND APPARATUS

[75] Inventors: David A. Moles, Katy; Charles R. Yemington, Houston, both of Tex.

[73] Assignee: Standard Oil Company, Cleveland, Ohio

[21] Appl. No.: 69,547

[22] Filed: Jul. 2, 1987

[51] Int. Cl.$^4$ .......................... E16L 1/04; E21B 43/01
[52] U.S. Cl. .................................... 405/169; 405/158; 405/170; 166/343
[58] Field of Search ............... 405/169, 168, 170, 171; 166/341, 343, 350, 338, 339; 285/24, 27, 18

[56] References Cited

U.S. PATENT DOCUMENTS

| | | | |
|---|---|---|---|
| 3,356,136 | 12/1967 | Haeber | 166/343 X |
| 3,434,295 | 3/1969 | Manning . | |
| 3,434,296 | 3/1969 | Otteman et al. | 405/169 X |
| 3,520,358 | 7/1970 | Brooks et al. . | |
| 3,729,941 | 5/1973 | Rochelle | 405/169 |
| 3,775,986 | 12/1973 | Daughtry | 405/169 |
| 3,967,462 | 7/1976 | DeJong | 166/343 X |
| 3,982,776 | 9/1976 | Payne . | |
| 4,041,719 | 8/1977 | Baugh . | |
| 4,074,541 | 2/1978 | Lochridge | 405/169 |
| 4,086,778 | 5/1978 | Latham . | |
| 4,098,091 | 7/1978 | Desai et al. . | |
| 4,133,182 | 1/1979 | Chateau | 405/169 |
| 4,342,519 | 8/1982 | Botrel et al. | 405/169 |
| 4,386,659 | 6/1983 | Shotbolt . | |
| 4,439,067 | 3/1984 | Bakk et al. . | |
| 4,459,065 | 7/1984 | Norton . | |
| 4,591,292 | 5/1986 | Stevens et al. | 405/169 |
| 4,620,818 | 11/1986 | Langner . | |
| 4,641,998 | 2/1987 | Baugh | 405/169 |

OTHER PUBLICATIONS

Bline, Mechanical Tie-In Sets Depth Record.
McDermott Tie-In Sets Water Depth Record, Pipe Line Industry, 1982, pp. 55-58.
Woods et al., Mechanical Connection Systems Show Promise for Deep Water Pipeline Construction Oil and Gas Journal, 1983.
Zimmerman et al., Design and Construction of the Hondo Sour Gas Pipeline, Offshore Technology Conference, 1983, pp. 75-84.
Gample et al., Deepwater Pipelines: East Brake Area; Offshore Texas, Offshore Technology Conference, 1985, pp. 273-290.
Diverless Installation of Flexible Platform Arrival Risers in 1,000 Foot Water Depth, 1984.

Primary Examiner—Dennis L. Taylor
Attorney, Agent, or Firm—Raymond F. Keller; David J. Untener; Larry W. Evans

[57] ABSTRACT

Method and apparatus for remotely connecting an offshore structure to an underwater pipeline using a remotely operated vehicle (ROV). The structure has a bell-mouthed bending guide at its base through which a winch line from the surface passes and is temporarily looped back and attached to an accessible place on the structure. Using the ROV and a surface tended messenger line the pull-in line is attached to a terminal assembly at the end of flexible pipe attached to the pipeline. The terminal assembly is pulled in horizontally to the guide, arcuately through the guide and then from the guide in general vertical alignment with a pipe end receiver assembly on the structure above the bending guide. At a location near the receiver assembly a towing head is removed from the terminal assembly and a second pull-in line is attached to the terminal assembly. The two pull-in lines are attached to opposite sides of the terminal for balanced pulling of the terminal assembly to connection with the receiver assembly. Alignment fixtures are provided for final alignment of respective connector halves in the assemblies prior to their connection.

21 Claims, 4 Drawing Sheets

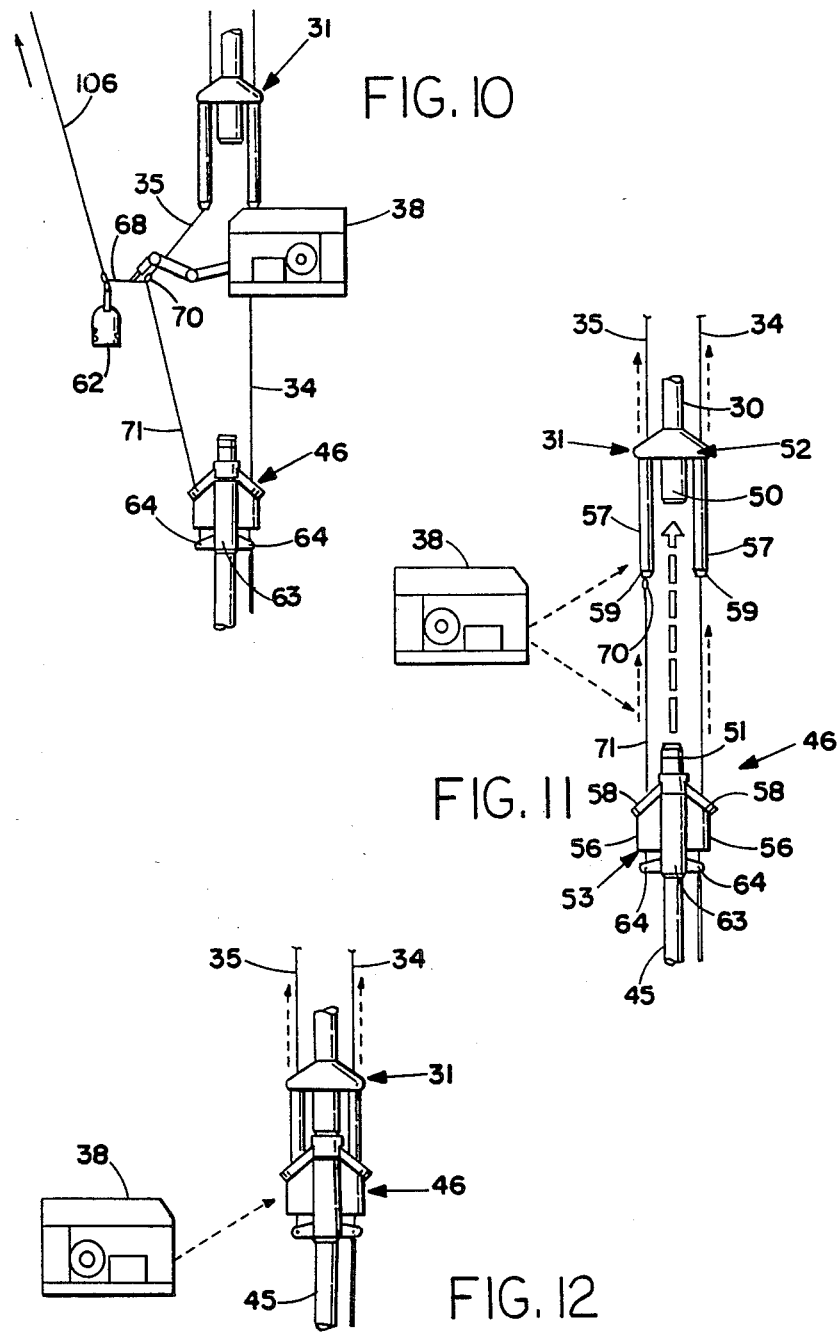

PIPELINE TO RISER CONNECTION METHOD AND APPARATUS

The invention herein described relates generally to the connection of underwater pipelines to offshore structures and more particularly to a method and apparatus for remotely connecting an underwater pipeline to a riser on an offshore structure.

BACKGROUND

In the offshore production of oil and gas, drilling and/or production equipment is typically mounted on a platform supported atop an offshore structure, often called a jacket, having a base situated on the sea floor. The oil and/or gas produced at the offshore structure commonly is transported to shore or other remote site by one or more pipelines laid on the sea floor. The pipeline(s) and the structure require different construction techniques and therefore usually are installed separately. Accordingly, it often is necessary to connect a pipeline to an offshore structure after one or both have been installed.

Various techniques heretofore have been utilized to connect underwater pipeline to an offshore structure or more specifically to production equipment located on the production platform above the surface of the water. These techniques were subject to various constraints including, inter alia, a requirement to install the structure before the pipeline is laid, a need to use divers to make a sub-sea connection, and a need to build heavy steel appurtenances into the offshore structure.

In relatively shallow water divers often are employed to connect the pipeline terminating at the base of the offshore structure to a riser flowline extending to the production equipment atop the structure. In water depths of several hundred feet or more the use of divers becomes economically unattractive. Moreover, in deeper waters, diving is dangerous and/or impractical.

Consequently, diverless or substantially diverless techniques have been developed, but again these techniques have associated therewith one or more drawbacks including in addition to those noted above: (1) installation substantially affected by surface conditions, (2) connection equipment interfering with jacket installation procedures, (3) need to remobilize a lay barge if connection made after installation of pipeline, (4) limited to relatively shallow water depths, (5) need for divers, (6) lack of flexibility in accommodating variations in positioning of jacket with respect to pipeline, (7) sensitivity to bottom currents, (8) need to handle great lengths of pipe, (9) sensitivity to poor soil and other sea floor conditions, (10) high cost in general, (11) high risk of damage to pipeline and/or structure during or after installation, (12) conflict with jacket installation operations, (13) long connection time, and (14) extensive surface support requirements.

SUMMARY OF THE INVENTION

The present invention eliminates or minimizes many of the above and other drawbacks associated with prior techniques to connect an underwater pipeline to an offshore structure particularly in deep water applications, as will become apparent from the following summary and detailed description of the method and apparatus of the invention.

Briefly, the invention provides apparatus for connecting an offshore structure to a pipeline lying on the sea floor, comprising a riser flowline carried by the offshore structure and extending downwardly from the surface along a portion, particularly a major portion, of the submerged height of the offshore structure to a point above the sea floor; a pipe end receiver assembly attached to the lower end of the riser flowline; a flexible pipe attached to the end of the pipeline; a pipe end terminal assembly attached to the free end of the flexible pipeline for connection to the receiver assembly on the offshore structure; a bending guide for the flexible pipe attached to the lower end of the offshore structure beneath the receiver assembly and above the sea floor; and means for pulling the free end of the flexible pipeline generally horizontally to the bending guide, then arcuately through the bending guide and then generally vertically upwardly from the bending guide to the receiver assembly for connection of the terminal assembly to the receiver.

The invention also provides a method of connecting a pipeline to an offshore structure comprising the steps of providing the offshore structure with a riser flowline extending downwardly from the water surface along a portion, particularly a major portion, of the submerged height of the structure to a pipe end receiver assembly; providing a bending guide on the structure beneath the pipe end receiver assembly; connecting to the end of the pipeline a length of flexible pipe having a pipe end terminal assembly at its free end; using a pull line to pull the pipe end terminal assembly horizontally to the bending guide, arcuately through the bending guide and then vertically upwardly from the bending guide to the pipe end receiver assembly; allowing gravity to assist in aligning the pipe end terminal assembly with the pipe end receiver assembly during such pulling of the pipe end terminal assembly from the bending guide to the pipe end receiver assembly; and then finally aligning and connecting the pipe end terminal assembly to the pipe end receiver assembly.

As will be appreciated, the apparatus and method permits connection of the pipe end relatively near the sea floor, thereby avoiding the cost and other potential disadvantages that would result from use of a greater length of flexible pipe needed to reach the surface and a conventional J-tube for guiding the pipe to the surface. However, the connection may be made sufficiently above the sea floor, well away from sediments which might contaminate connection seals and which may obscure visibility and inhibit operations when disturbed such as by the activities of a remotely operated vehicle. The invention also permits the connection to be made at an elevation along the structure to which divers can be safely and economically applied if needed or desired.

In accordance with the invention, the bending guide, preferably in the form of a bell mouth, brings the pipe end terminal assembly into course alignment with the receiver assembly to insure that alignment fixtures provided thereon will engage properly and further align connector halves in the assemblies. Importantly, the force of gravity acts to assist rather than hinder vertical alignment of the terminal assembly with the receiver assembly as they are brought together for final alignment and connection of the connector halves. Moreover, this alignment of the assemblies is independent of the direction from which the flexible pipe approaches the offshore structure within a large window that, for example, may be plus or minus 90 degrees of perpendicular to a nominal heading. The bending guide also controls the minimum bending radius of the flexible pipe to prevent damage to the flexible pipe as the pipe is redirected from horizontal to vertical; restrains the flexible pipe in the immediate vicinity of the structure to minimize the exposure to damage from oscillations or other movement due to sea currents throughout the life of the installation; holds the flexible pipe in a manner which insures that, should a dragging anchor snag the pipe and pull it out of position after it is connected, forces in the pipe will act axially along the pipe or laterally against a curved surface of the bending guide of sufficient radius to protect against kinking or buckling of the pipe; holds the pipe in a manner which insures that, should a dragging anchor snag the pipe after it is connected, forces in the pipe will act axially through the connector halves, thus avoiding side loading on the connector halves and associated seal or seals; and provides some protection from falling objects near the platform.

The invention further has alignment provisions which do not preclude a smooth outer profile of the pipe end terminal assembly preferably provided to prevent catching of the pipe end terminal assembly on irregularities of the sea floor or other sub-sea appurtenances as it is pulled into position; provisions for connection of a single pull-in line which acts along the axis of the flexible pipe to pull the pipe end terminal assembly across the sea floor and through the bending guide, thereby reducing exposure to pull-in line entanglement; provisions for relocation of the pull-in line attachment point on the pipe end terminal assembly after the assembly is in position for final alignment, at which time it becomes preferable to have two symmetrically positioned pull-in lines to accomplish full seating of the connector sealing surfaces; and provisions for attaching a lift line to the pipe end terminal assembly in line with the center of gravity of the assembly to reduce bending moments which might damage the flexible pipe where it joins the pipe end terminal assembly.

Among the many advantages obtained by the invention are: the invention may be practiced at any water depth and more economically as the water depth increases, the structure can be installed either before or after the pipeline is laid, low sensitivity to positioning errors of the structure and pipe end, minimal conflict with jacket installation operations, low risk of damage to pipeline and structure, and minimal surface support requirements.

The foregoing and other features of the invention are hereinafter more fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings,

FIG. 10 is an elevational view illustrating recovery of the pulling head;

FIG. 11 is an elevational view illustrating alignment and mating of connector fittings respectively included in the pipe end terminal assembly and pipe end receiver assembly; and FIG. 12 is an elevational view showing the pipe end terminal assembly and pipe end receiver assembly fully coupled together.

DETAILED DESCRIPTION

Figure 1:
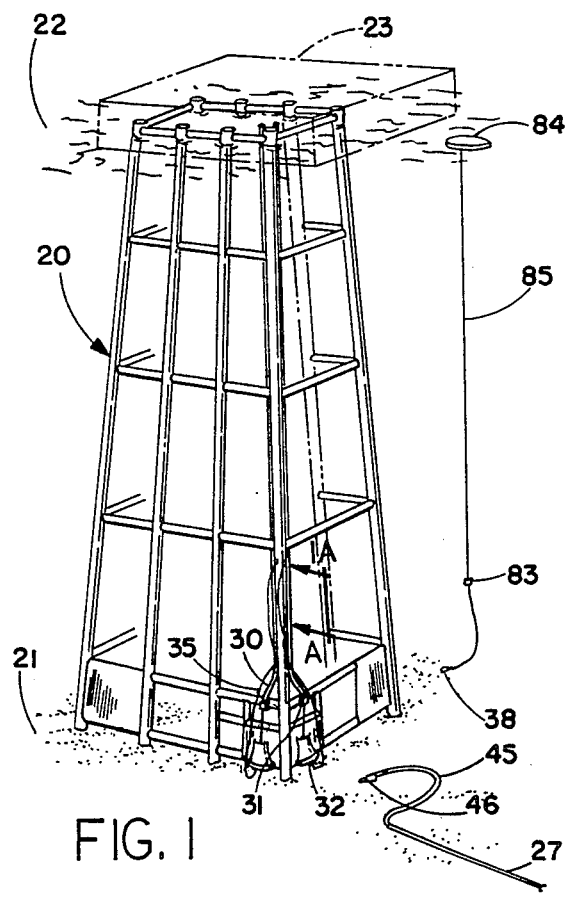
FIG. 1 is a pictorial illustration of apparatus according to the invention prior to connection of a pipeline to an offshore structure.

Referring now in detail to the drawings and initially to FIG. 1, an offshore oil and/or gas production structure 20 is anchored to the sea floor 21. The offshore structure 20, also herein referred to as a jacket, extends above the surface 22 of the water and supports a platform shown in phantom lines at 23. Oil and/or gas production equipment may be mounted in known manner to the platform and connected to one or more production wells.

In FIG. 1 the jacket 20 is shown installed at the offshore site but prior to connection (tie-in) to a pipeline 27 laid on the sea floor 21 with one end of the pipeline 27 located in the vicinity of the jacket. The pipeline may extend to shore or other remote site for transport thereto of oil or gas produced at the jacket 20.

The depth of water in which the present invention is intended to be practiced may well exceed the depths at which diver-based tie-in techniques for pipelines and jackets become impractical or too dangerous. The invention may be practiced for example at depths exceeding 500 feet and with increasing relative economic benefit at greater depths up to and exceeding 1000 feet. It will be appreciated, however, that the invention may be practiced at shallower depths if desired. The following description of a preferred apparatus and method according to the invention is made in relation to a water depth of about 850 feet.

In accordance with the invention, the jacket 20 carries a riser flowline 30 extending downwardly from above the water surface 22 along a major portion of submerged height of the jacket to a pipe end receiver assembly 31. The pipe end receiver assembly 31 is attached to the jacket above a pipe bending guide 32 located on the jacket at a position above the sea floor 21 including any mud or other sediments. Details of the bending guide 32 are hereinafter described.

The jacket 20 is further outfitted with pull-in lines 34 and 35 which run downwardly from the water surface 22 to the pipe end receiver assembly 31. At regular intervals along the height of the jacket the pull-in lines preferably pass through respective line guides attached to a leg 36 of the jacket to position and prevent entanglement of the pull-in lines.

Figure 5:
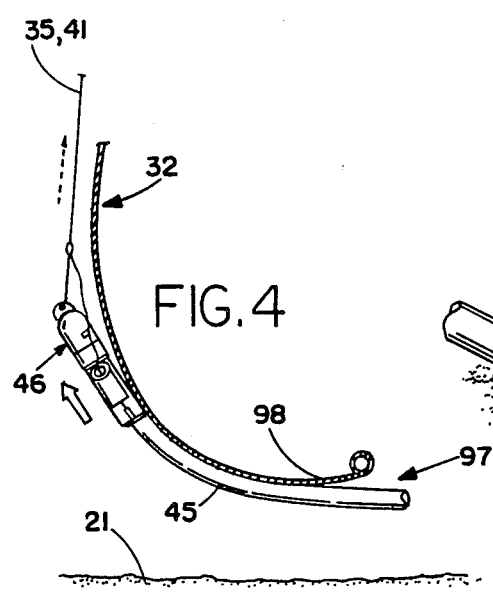
FIG. 5 is a pictorial view illustrating the pipe end terminal assembly in course vertical alignment with a pipe end receiver assembly on the offshore structure and from which a riser flowline extends to the surface.

After passage through the pipe end receiver assembly 31, pull-in line 34 is looped back and tied off to the jacket 20 at an accessible location with soft line as illustrated in FIG. 5. The soft line may be light manila tiedown line that can be easily cut by a remotely operated vehicle 38, herein abbreviated ROV, and the looped back portion of pull-in line 34 preferably is tied off in the vicinity of the pipe end receiver assembly as seen in FIG. 5.

Figure 1A:
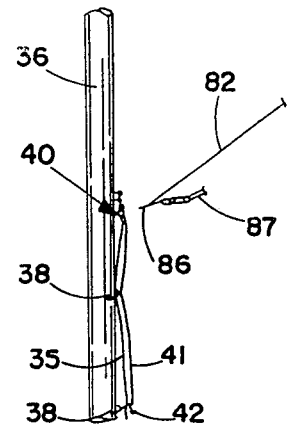
FIG. 1A is an enlarged partial view of the apparatus of FIG. 1 looking generally in the direction of the arrows 1A—1A thereof.

The other pull-in line 35 runs on down through the bending guide 32 and then is looped back and tied off to the jacket with soft line as shown in FIGS. 1 and IA. The looped back portion of pull-in line 35 is of much greater length than the looped back portion of pull-in line 34 and may be, for example, several hundred feet in length to provide adequate length to reach the terminal end of the pipeline 27. The looped back portion of pull-in line 34 may be 60 feet in length, for example. As seen in FIG. 1A, the looped back portion of pull-in line 35 is tied off by soft line to pad eyes 38 on the leg 36 of the jacket at intervals of 50 feet for example.

As further seen in FIG. 1A, a connection link 40 is attached to the end of pull-in line 35. A relatively short tag line 41 extends from the connection link 40 and may be formed by a distal end portion of pull-in line 35. Attached to the end of the tag line 41 is a hook 42 or other suitable connection device for the hereinafter discussed purpose for such hook. Likewise, the connection link 40 may be replaced by an equivalent device as may other line attachment devices hereinafter identified.

The pull-in lines 34 and 35 may be rigged before the jacket 20 is set in place or afterwards by using the ROV 38.

Returning to FIG. 1, apparatus according to the invention can further be seen to include a length of flexible pipe 45 connected to the end of the pipeline 27. At its free end, i.e., its end opposite the pipeline, the flexible pipe has attached thereto a pipe end terminal assembly 46 for connecting with the pipe end receiver assembly 31. The flexible pipe is provided with sufficient slack, i.e., a loop, to permit the free end thereof or more particularly the pipe end terminal assembly 46 to be pulled horizontally to the bending guide 32 and then upwardly to the pipe end receiver assembly 31 preferably without or only minimally disturbing the pipeline 27 which may be formed from relatively rigid pipe sections of considerably less cost per foot than flexible pipe.

In FIG. 11 the pipe end receiver assembly 31 and the pipe end terminal assembly 46 can be seen to include mating connector fittings 50 and 51 which may be of any suitable type such as female and male connector halves of a boltless, hydraulic diverless connector. The two assemblies 31 and 46 also include mating alignment fixtures 52 and 53 which can be seen to be of male and female type, respectively. In the illustrated embodiment, the male connector fitting 51 and female alignment fixture 53 are included in the pipe end terminal assembly 46 and the mating female connector 50 and the male alignment fixture 52 are included in the pipe end receiver assembly 31. The male connector fitting 51 and the female alignment fixture 53 are attached to the flexible pipe 45 before the flexible pipe is laid on the sea floor and the female connector fitting 50 and the male alignment fixture 52 are installed on the jacket before installation of the jacket on the sea floor.

The female alignment fixture 53 is captive on the male connector fitting 51 but free to swivel around the axis of such fitting and the flexible pipe 45 so that torsional forces in the flexible pipe will not interfere with alignment of the male connector fitting 51 with the mating female connector fitting 50 in the pipe end receiving assembly 31. The female alignment fixture 53 includes at the sides thereof respective guide sleeves 56 for receiving respective guide posts or pins 57 in the male alignment fixture 52. Preferably the guide sleeves have flared entranceways 58 and the guide pins have tapered leading ends 59 to facilitate the entry of the guide pins into the guide sleeves. The guide pins also have axial passageways through which respective ones of the pull-in lines 34 and 35 are threaded. Locating the guide pins 57 on the structure and the sleeves on the pipe end terminal assembly, rather than vice versa, reduces the possibility of the pipe end terminal assembly catching on debris and obstructions on the sea floor while permitting cross-bottom pull with only a single line.

The pipe end terminal assembly 46 further includes a pulling head 62 (shown detached in FIG. 9 and installed in FIG. 2), strain relief 63, and pull-in line attachment ears 64. In addition to providing a means by which the pipe end terminal assembly may be pulled, the pulling head 62 may protect the sealing surfaces on the male connector fitting 51 and may serve as a seal to permit leak testing of the pipeline 27. The pulling head 62 also provides snag-free initiation of the pipe end terminal assembly into and through the bending guide 32. The function of the strain relief 63 is to distribute bending forces at the junction of the flexible pipe 45 and the pipe end terminal assembly 46. The attachment ears 64 are aligned with and behind the respective guide sleeves 56 and their function will become more apparent from the hereinafter description of the connection method.

Figure 2:
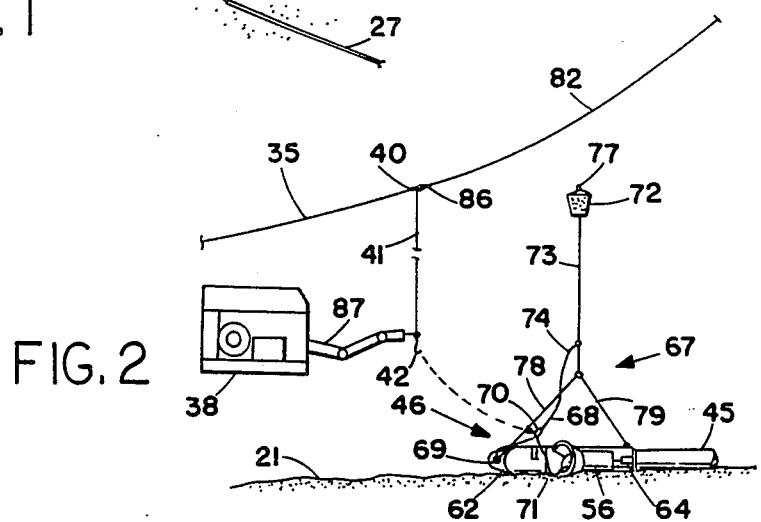
FIG. 2 is an elevational view illustrating attachment of a first pull line from the offshore structure to a pipe end terminal assembly attached to flexible pipe at the end of the pipeline.

The pipe end terminal assembly 46 also preferably is provided with the rigging shown generally at 67 in FIG. 2. The rigging 67 includes a short length of tow line 68 attached to the leading end of the pulling head at an eye 69. The tow line is terminated at a grab connection link 70 which, as will be seen, provides a handy point for attachment of the hook 42 at the end of pull-in line 35. The rigging 67 also includes a pull-in extension line 71 attached at one end to grab connection link 70 and at its other end to the attachment ear 64 aligned with the guide sleeve 56 through which the pull-in extension line 71 passes. For added convenience in attaching the pull-in line 35 to the grab connection link 70, the grab connection link preferably is held up above the sea floor 21 by a buoyancy module 72 via a line 73 and short line 74, the buoyancy module providing enough lift, for example about 200 pounds of lift, to hold the grab connection link above the sea floor and reasonably stationary so that the ROV 38 can easily attach the pull-in line to the connection link.

Under certain circumstances, as when the sea floor 21 consists of soft mud which will not support the pipe end terminal assembly 46 or consists of rocks or other irregularities on which the pipe end terminal assembly would catch as it is pulled to the jacket, it may be desirable or necessary to lift the entire pipe end terminal assembly above the sea floor as it is being pulled to the jacket. The lifting may be effected from the surface by convenient attachment of a lift line to a pad eye 77 provided on the buoyancy module 72. The lifting force preferably should be substantially in line with the center of gravity of the pipe end terminal assembly to minimize bending forces which might concentrate at the point where the flexible pipe 45 joins the pipe end terminal assembly. To this end bridle or harness lines 78 and 79 are employed to attach the lower end of line 73 to the pipe end terminal assembly as shown, the harness lines spanning the center of gravity of the pipe end terminal assembly. The lengths of the harness lines can be selected to place the lifting point directly above the center of gravity of the pipe end terminal assembly.

The method of the invention will now be described, as will further details of the apparatus, with sequential reference to FIGS. 1–12. Initially, the jacket 20 and the pipe end terminal assembly 46 are installed and abandoned within respective target zones as shown in FIG. 1 employing conventional offshore construction practices. If the pipeline 27 has been installed before the jacket, the jacket may be set within a target zone having, for example, a 50 foot radius providing a nominal separation between the jacket and pipe end 46 of 200 feet, for example, to minimize risk of damage to the flexible pipe 45 during jacket installation.

The ROV 38 is then deployed preferably initially to inspect the flexible pipe 45 and jacket appurtenances, to remove a protective cover having preferably been provided on the connecting surface of the jacket mounted connector fitting, and to place an acoustic transponder on the jacket 20 near the bending guide 32 to facilitate monitoring of sub-sea activities at the water surface. After these initial procedures, if performed, the ROV is operated to acquire the end of pull-in line 3 from the jacket and carry it for attachment to the pipe end terminal assembly 46.

If the weight of the pull-in line 35 exceeds the lifting capability of the ROV 38, a surface tended, light weight messenger line 82 is utilized as shown in FIGS. 1A and 2. Preferably a relatively short messenger line of about 50 feet for example is attached to the ROV cage 83 which is tended by a surface support vessel 84 via umbilical 85 (FIG. 1). A hook 86, toggle or equivalent connecting device attached to the end of the messenger line 82 is grasped by the manipulator 87 of the ROV 38 and carried to and attached to the connection link 40 on pull-in line 35 as shown in FIG. 1A. The surface support vessel 84 which is tending the messenger line 82 then moves away from the jacket 20, pulling the messenger line taut or, more specifically, the ROV cage 83 generally horizontally away from the jacket which pulls the messenger line taut to prevent entanglement. Then the ROV is operated to cut the soft line ties which held the looped back portion of pull-in line 35 to the jacket. As each tie is cut, the cage will swing away from the jacket pulling pull-in line 35 towards the pipe end terminal assembly 46 while keeping the line taut and preventing tangles. In this manner the end of the pull-in line is carried to the vicinity of the pipe end terminal assembly.

Acoustic transponders preferably provided on the pipe end terminal assembly 46 and on the ROV 38 provide a surface display of the position of the ROV relative to the pipe end terminal assembly. After the surface vessel 84 has been maneuvered to bring the end of pull-in line 35 within video range of the pipe end terminal assembly, the ROV is caused to move down to the hook 42 at the end of the tag line 41 and grasp in its manipulator 87 the hook as seen in FIG. 2. Then, as the messenger line 82 is lowered to provide slack, the ROV is operated to carry the hook down to the pipe end terminal assembly and attach the hook to the grab connection link 70 in the rigging 67 on the pipe end terminal assembly.

After pull-in line 35 has been attached to the grab connection link 70, the ROV 38 is used to cut the line 74 that held the grab connection link 70 to line 73. The ROV also is used to disconnect or cut the messenger line 82, which is no longer needed, free from pull-in line 35. Then, when pull-in line 35 is drawn through the bending guide 32 to pull in the pipe end terminal assembly 46, pull-in line 35 will align generally with the axis of the flexible pipe 45 at the pipe end terminal assembly as well as the terminal assembly whereby the pulling or towing force will act through the axis of the pipe end terminal assembly, as seen in FIG. 3.

Figure 3:
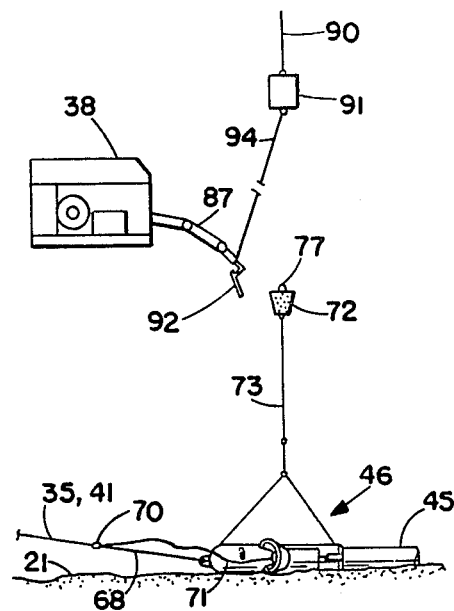
FIG. 3 is an elevational view illustrating attachment of a lift line to the pipe end terminal assembly.

If sea floor conditions are such that the pipe end terminal assembly 46 should be lifted while it is being pulled across the sea floor 21, for example to prevent the assembly from digging into mud forming the upper layer of the sea floor, a lift line 90 is attached at this time to the pipe end terminal assembly as shown in FIG. 3. The lift line 90 is lowered from the surface support vessel 84 (FIG. 1) for making this connection as shown in FIG. 3. A clump weight 91 on the lift line near its lower end keeps the line taut and vertical and further prevents current from sweeping the lift line away as it is lowered. The clump weight also provides a sonar target which can be easily located by the ROV 38. With the end of the lift line just above the sea floor, say 30 to 50 feet, the ROV is operated to grasp at its manipulator 87 the hook 92 on the end of the lift line and attach it to the lifting eye 77 on the buoyancy module 72.

As previously described for attachment of pull-in line 35 to the pipe end terminal assembly 46, the acoustic transponders on the ROV 38 and the pipe end terminal assembly are used to guide the ROV to within video range of the pipe end terminal assembly, If necessary the surface support vessel 84 may have to be re-positioned to bring the clump weight 91 into an acceptable footprint around the pipe end. The ROV then may be operated to pull the end of the lift line over to the buoyancy module for attachment thereto.

At this point the lift line 90 is tensioned and raised to lift and hold the pipe end terminal assembly 46 suitably clear of the sea floor 21 and any obstructions thereon. Typically the pipe end terminal assembly should nominally be held approximately 1 to 2 feet off the sea floor, but this elevation is not critical and need not be held steady. Under moderate surface conditions a braided nylon link in the lift line should provide adequate damping of the vessel heave motion. If heave is excessive the lift line may be transferred to the jacket 20 and more particularly the platform 23 supported thereon where the lift line can be tensioned by a winch on the platform while the pipe end terminal assembly is being pulled towards the base of the jacket. If the lift line is tensioned from the platform it may be considerably off vertical at the start of the pull-in procedure. Therefore, a component of the tension in the lift line will add to the force exerted by the pull-in line. Also the lift line will require continuous tending to account for the change in angle as the pipe end terminal assembly is drawn closer to the jacket.

Pull-in line 35 is tensioned and taken up by a winch located atop the jacket 20 to pull the pipe end terminal assembly 46 across the sea floor 21 to the jacket. Of course the flexible pipe 45 will be towed along with te slack therein being taken up as needed. The position of the flexible pipe preferably is monitored during pull with the use of the acoustic transponders, one near or on the bending guide 32, one on the pipe end terminal assembly and preferably another at the opposite end of the flexible pipe. The ROV 38 also may be used to provide continuous observation of the flexible pipe as it is pulled toward the jacket. Particular attention should be given to the bend which is initially preferably at the midpoint of the flexible pipe, and which progresses across the sea floor during the pull.

When the pipe end terminal assembly 46 comes close to the bending guide 32, for example within about 5 feet of the bending guide, the pull is halted to enable the ROV 38 to be operated to disconnect the lift line 90, buoyancy module 72 and rigging 67 from the pipe end terminal assembly. After disconnection from the pipe end terminal assembly the buoyancy module will rise in free ascent until it is stopped when the short line 94 between it and the clump weight on the lift line becomes taut. The clump weight and the buoyancy module then can be recovered to the surface by recovering the lift line. The transponder on the pipe end terminal assembly may also be removed at this time by the ROV and recovered to the surface, or if attached to line 73 it will come to the surface with the bouyancy module 72.

Figure 4:
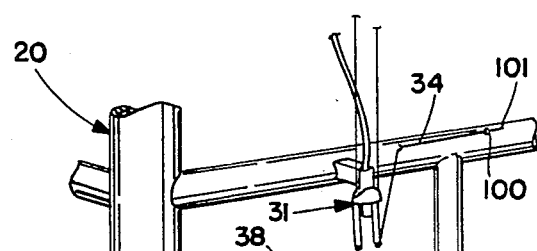
FIG. 4 is a vertical sectional view through a flexible pipe bending guide on the offshore structure illustrating movement of the pipe end terminal assembly through the bending guide.

After disconnection from the lift line 90 and buoyancy module 72, the pipe end terminal assembly 46 is pulled by pulling line 35 through the bending guide 32 as shown in FIGS. 4 and 5 to a position below the pipe end receiver assembly 31 preferably while observed by the ROV 38. The bending guide 32 in the illustrated apparatus is in the form of a large bell mouth attached to the side of the jacket 20. The bending guide controls the position and minimum bending radius of the flexible pipe as the flexible pipe arcuately turns from horizontal to vertical as shown in FIG. 4. The bending guide also provides course alignment between the axis of the pipe end terminal assembly and the pipe end terminal receiver assembly. In addition the bending guide provides protection to the flexible pipe over the life of the installation by restraining the flexible pipe in the near vicinity of the jacket. Restraining the flexible pipe in this manner will insure that, in the event of an anchor drag, loading on the flexible pipe near the rigidly mounted connector will be along the axis of the pipe and connector. The bending guide also provides local protection against objects falling from platform 23.

The bending guide 32 may take other forms such as an L-shape tubular member having a flared horizontal leg curving gradually upwardly to a vertical leg substantially vertically aligned with the pipe end receiver assembly. In any event, the bending guide preferably has a gradually curved guide surface 96 at the inside of the pipe bend having a radius greater than the minimum allowable bending radius of the flexible pipe 45. Also the bending guide has a flared lower horizontal entrance 97 extending through a substantial arc preferably about 180 degrees for tolerating a wide range of relative positions of the flexible pipe. As seen in FIG. 4, the lower entrance 97 of the bending guide is defined by a lower rim portion 98 thereof extending substantially horizontally preferably with a slightly upward bend moving to the outer edge of the rim.

Figure 6:
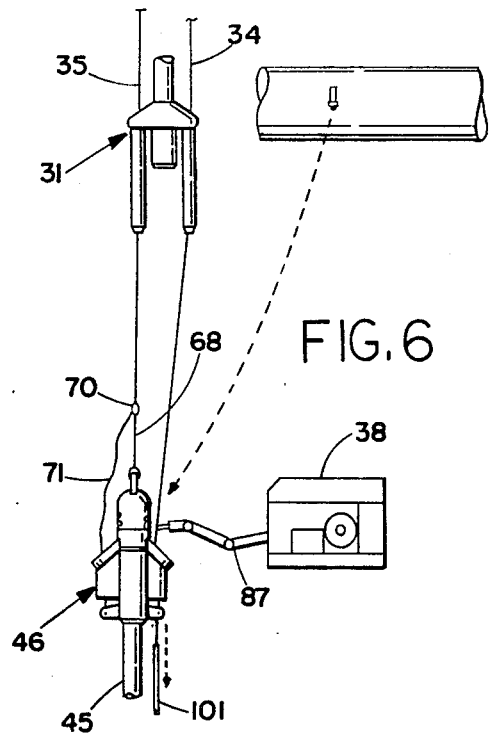
FIG. 6 is an elevational view illustrating passage of a second pull line through a guide sleeve in the pipe end terminal assembly.
Figure 7:
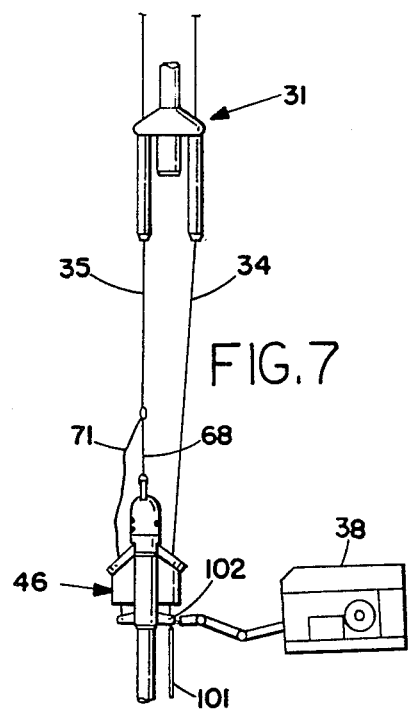
FIG. 7 is an elevational view illustrating attachment of the second pull line to the pipe end terminal assembly.

With the pipe end terminal assembly 46 located between the bending guide 32 and pipe end receiver assembly 31 and generally in vertical alignment with the pipe end receiver assembly, pulling again is stopped for attachment of the second pull-in line 34 to the pipe end terminal assembly as shown in FIGS. 5-7. The ROV 38 is operated to locate the end of the second pull line and cut it free from its tie-downs seen at 100 in FIG. 5. Once free, the ROV is caused to grasp the second pull-in line at a position spaced from its end to which a weight 101 preferably is attached. The weight 101 will cause the end portion of the second pull-in line to extend vertically downwardly from the place grasped by the manipulator 87 of the ROV. The ROV is then operated to lower the weight 101 down through the guide sleeve 56 of the pipe end terminal assembly opposite that through which pull-in extension line 71 passes. After this is done, the ROV is caused to move down to the bottom end of the guide sleeve and to grab and attach the hook 102 at the end of the second pull-in line 34 to the ear 64 of the pipe end terminal assembly opposite the ear to which the first pull-in line 35 is connected by the tow extension line, as seen in FIG. 7.

Figure 8:
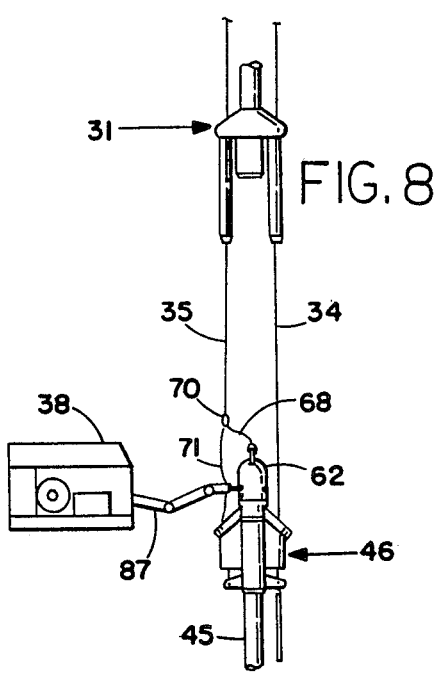
FIG. 8 is an elevational view illustrating disengagement of a pulling head from the pipe end terminal assembly.

After attachment to the pipe end terminal assembly 46 in the above manner, the second pull-in line 34 is tensioned by a winch atop the jacket 20 until the second pull-in line takes the weight of the suspended pipe end terminal assembly and suspended portion of the flexible pipe 45 as shown in FIG. 8. The ROV 38 then is used to release the pulling head 62 from the male connector fitting 51. Then the first pull-in line 35 is again tensioned to lift the pulling head off the male connector fitting, there being sufficient slack in the pull-in extension line 71 to permit this operation.

Figure 9:
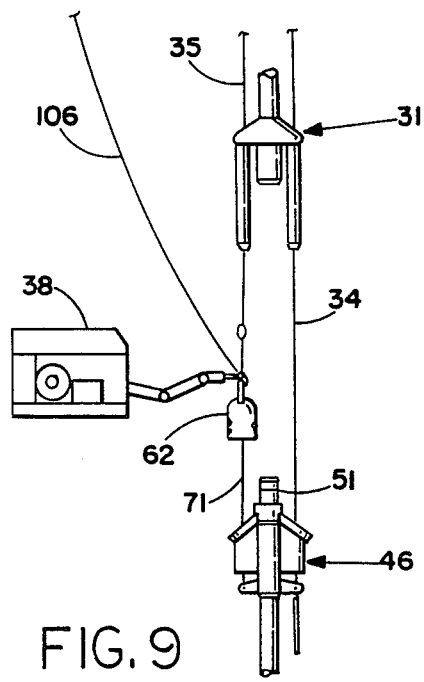
FIG. 9 is an elevational view illustrating attachment of a lift line to the pulling head.

The ROV 38 then is used to attach a lift line 106 to the pulling head 62 so that it can be lifted away from the jacket 20 as shown in FIGS. 9 and 10. The lift line 106 is deployed and attached in a manner similar to that above described for connection of lift line to the pipe end terminal assembly. The lift line is then tensioned to take the weight of the pulling head and pull it away from the pipe end terminal assembly as seen in FIG. 10. Clearance can be increased by several feet by paying out pull-in line 35 from the pulling winch associated therewith atop the jacket. The ROV then is used to cut line 68 so that the pulling head can be lifted away by the lift line. This leaves the male connector fitting 51 of the pipe end terminal assembly exposed and ready for connection to the female connector fitting 50 in the pipe end receiver assembly 31. Recovery of the pulling head also leaves the pull-in extension line 71 clear to be pulled through the axial passageway in the alignment pin 57 of the jacket mounted alignment fixture 52.

Having removed the pulling head 62, both pull-in lines 34 and 35 are taken up to raise the pipe end terminal assembly 46 and bring the male connector fitting 51 to engagement with the female connector fitting 50 preferably while the ROV provides visual observation as depicted in FIG. 11. It is noted and considered important that because of the vertical orientation of the pipe end assembly and its positioning beneath the pipe end receiver assembly, gravity will assist rather than hinder general alignment of the pipe end terminal assembly with the pipe end receiver assembly as they are brought together. The guide pins 57 on the jacket mounted alignment fixture enter the guide sleeves 56 on the pipe end mounted alignment fixture to align the connector fittings prior to mating of such fittings. As would typically be the case, the guide sleeves and pins provide intermediate alignment enabling the connector fittings to mate and finally precisely align with one another. The connector fittings per se may be of suitable conventional type and do not form a part of the subject invention. If the connector is of hydraulic type as is preferred, hydraulic lines on the structure are then use to provide hydraulic power to latch the connector. The hydraulic lines also provide pressure to leak test the seal between the connector fittings. The connector fittings preferably are provided with hydraulic connection ports to allow hydraulic power from the ROV to be used as a backup or alternate hydraulic pressure source.

If it is desired to keep the diameter of the axial passageway through the guide pins 57 of alignment fixture 52 small, they may not be large enough to pass the grab connection link 70. To avoid having to pull the connection link 70 through the passageway in the pin, the ROV may be used to pull the connection link down through the sleeve of the pipe end alignment fixture and attach it directly to the ear 64 as with a hook. As will be appreciated passage of the pull-in lines through the guide pins and their coaxial extension through the guide sleeves operates to bring the guide mechanism into sufficiently close alignment to allow proper engagement of the pins and sleeves.

After the connection is complete as seen in FIG. 12, the ROV 38 is used to inspect the connection and the full length of the flexible pipe. The ROV also is used to disconnect the pull-in lines from the pipe end terminal assembly so that the lines can be recovered to the surface, the weight of the elevated portion of the flexible pipe then being carried by the mechanical connector. The connector seal may also be pressure tested by pressure supplied from the jacket.

As will be appreciated, the foregoing connecting procedure may be varied while still employing basic principles of the invention. For example, the line 106 (FIGS. 9 and 10) may be deployed through the bending guide and out to the pipe end 46 for use in cross-bottom pull of the pipe end. Line 106 could be installed on the jacket before launch or run when needed. One advantage of this modified procedure is that when the pulling head 62 is removed, the rigging fittings go with it so only slick lines 34 and 35 are pulled through the guide posts 57 (FIG. 11).

Although the invention has been shown and described with respect to a preferred embodiment, it is obvious that equivalent alterations and modifications will occur to those skilled in the art upon the reading and understanding of this specification. The present invention includes all such equivalent alterations and modifications, and is limited only by the scope of the following claims.

What is claimed is:

1. Apparatus for connecting an offshore structure to a pipeline lying on the sea floor, comprising:
   a riser flowline carried by said offshore structure and extending downwardly from the surface along a portion of the submerged height of the offshore structure to a point above the sea floor;
   a pipe end receiver attached to the lower end of said riser flowline;
   a flexible pipe attached to the end of said pipeline;
   a pipe end terminal attached to the free end of said flexible pipeline for connection to said receiver on said offshore structure;
   a bending guide for said flexible pipe attached to the lower end of said offshore structure beneath said receiver and above the sea floor; and
   means for pulling the free end of said flexible pipeline generally horizontally to said bending guide, then arcuately through said bending guide and then generally vertically upwardly from said bending guide to said receiver for connection of said terminal to said receiver.

2. Apparatus as set forth in claim wherein said receiver and terminal include respective halves of a connector.

3. Apparatus as set forth in claim 2, wherein said connector is a boltless, hydraulically operated diverless connector.

4. Apparatus as set forth in claim 2, wherein said receiver and terminal further include respective alignment means engageable with one another to guide said connector halves to alignment with one another prior to connection.

5. Apparatus as set forth in claim 4, wherein one said alignment means includes at least one guide pin and the other said alignment means includes at least one guide sleeve for locatingly receiving said guide pin.

6. Apparatus as set forth in claim 5, wherein said guide pin is on said structure and said means for pulling includes a pull-in line extending downwardly to and through said guide pin and then to and through said bending guide for attachment to said pipe end terminal.

7. Apparatus as set forth in claim 3, wherein said means for pulling includes a pair of pull-in lines extending downwardly to and past said receiver for connection to said terminal at respective sides of said terminal, and there is provided means for guiding passage of said pull-in lines at respective sides of said receiver for guiding said terminal to engagement with said receiver as the pull-in lines are taken up.

8. Apparatus as set forth in claim 3, wherein said means for pulling includes at least one pull-in line extending downwardly to and past said receiver and to and through said bending guide for connection to said terminal.

9. Apparatus as set forth in claim 8, wherein said pull-in line is looped back from the bending guide and tied off to the structure prior to tie-in of said structure to said pipeline.

10. Apparatus as set forth in claim 8, further comprising remotely operated vehicle means for attaching an end of said pull-in line to said terminal.

11. Apparatus as set forth in claim 8, wherein said terminal means has means for attaching thereto said pull-in line such that the pulling force applied by said pull-in line is substantially aligned with the axis of said flexible pipe at said terminal.

12. Apparatus as set forth in claim 8, wherein said terminal has a length of pull line connected thereto and provided at a free portion thereof with means to connect with said pull-in line, and there being provided buoyancy means for holding said free portion elevated above the sea floor.

13. Apparatus as set forth in claim 1, wherein said bending guide includes arcuate guide surface means having a radius greater than the minimum bending radius of said flexible pipe.

14. Apparatus as set forth in claim 13, wherein said bending guide is in the form of a bell mouth mounted to the structure with it major axis extending vertically.

15. A method of connecting a submerged pipeline lying on the sea floor to an offshore structure comprising the steps of:

(a) providing the offshore structure with a riser flowline extending downwardly from the water surface along a portion of the submerged height of the structure to a pipe end receiver assembly at a submerged location above the sea floor;
(b) providing a bending guide on the structure beneath the pipe end receiver assembly;
(c) connecting to the end of the pipeline a length of flexible pipe having a pipe end terminal assembly at its free end;
(d) using a pull line to pull the pipe end terminal assembly horizontally to the bending guide, arcuately through the bending guide and then vertically upwardly from the bending guide to the pipe end receiver assembly;
(e) aligning the pipe end terminal assembly with the pipe end receiver assembly during such pulling of the pipe end terminal assembly from the bending guide to the pipe end receiver assembly; and
(f) then connecting the pipe end terminal assembly to the pipe end receiver assembly.

16. A method as set forth in claim 15, wherein step (f) includes connecting one half of a connector in the receiver assembly to the other half in the terminal assembly, and engaging respective alignment fixtures in the terminal assembly and receiver assembly to guide the connector halves to alignment prior to connection.

17. A method as set forth in claim 16, wherein said engaging step includes engaging a guide pin of one alignment fixture in a guide sleeve of the other alignment fixture.

18. A method as set forth in claim 15, wherein step (d) includes connecting a pull-in line to the pipe end terminal assembly such that when the pull-in line is taken up the pulling force is applied generally axially to the flexible pipe at the terminal assembly.

19. A method as set forth in claim 15, wherein step (d) includes pulling the terminal assembly substantially vertically upwardly from the bending guide to the receiver assembly with two pull-in lines connected to respective sides of the terminal assembly.

20. A method as set forth in claim 19, including the step of drawing the two pull-in lines through respective guides therefor at respective sides of the receiver assembly.

21. A method as set forth in claim 15, including the step of lifting the terminal assembly off the sea floor during pulling of the terminal assembly towards the structure.

* * * * *